(12) United States Patent
Kelley et al.

(10) Patent No.: US 6,287,411 B1
(45) Date of Patent: Sep. 11, 2001

(54) BONDING A THERMOPLASTIC ELASTOMER TO A MAGNESIUM BASED METAL

(75) Inventors: Charles A. Kelley, Chaska; Eric J. Krause, Big Lake; Cecil H. Nelson, Chanhassen, all of MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/336,882

(22) Filed: Jun. 18, 1999

(51) Int. Cl.⁷ .................. C09J 119/00; B32B 15/08; B32B 27/32
(52) U.S. Cl. .................. 156/327; 156/333; 428/461; 428/523; 428/516; 427/407.1; 525/131; 525/445
(58) Field of Search .................. 525/131, 445, 525/455; 427/41, 410, 407.1; 428/416, 461, 516, 523; 524/361; 156/333.1, 327, 333

(56) References Cited

U.S. PATENT DOCUMENTS

| 3,894,982 | * | 7/1975 | Polaski | 260/33.6 A |
| 4,119,587 | | 10/1978 | Jazenski et al. | 260/3.5 |
| 4,297,159 | | 10/1981 | Dobias et al. | 156/307.7 |
| 4,613,533 | | 9/1986 | Loomis et al. | 428/36 |
| 4,627,993 | | 12/1986 | Loomis | 428/36 |
| 4,739,012 | | 4/1988 | Hagman | 525/92 |
| 4,857,131 | | 8/1989 | Damico et al. | 156/331.4 |
| 5,030,515 | * | 7/1991 | Ozawa et al. | 428/416 |
| 5,051,474 | | 9/1991 | Warren et al. | 525/131 |
| 5,268,404 | | 12/1993 | Mowrey | 524/236 |
| 5,281,638 | | 1/1994 | Mowrey | 524/105 |
| 5,496,884 | | 3/1996 | Weih et al. | 524/503 |

OTHER PUBLICATIONS

Advanced Polymer Alloys, "Bonding Alcryn to Various Substrates", Bonding Guide pp. 1–8; 11/97.
Advanced Polymer Alloys, "Choosing Which Material to Use" ;1998.
Lord Chemical Products, "Chemlock 480/Curative 44 TPE Adhesive" Production Information;1995.

* cited by examiner

Primary Examiner—Peter D. Mulcahy
Assistant Examiner—R. Harlan
(74) Attorney, Agent, or Firm—Gregory Turocy; Alexander M. Gerasimow; William R. Walbrun

(57) ABSTRACT

In one embodiment, the present invention relates to a bonded assembly made of a magnesium containing metal comprising at least about 25% by weight magnesium, a thermoplastic elastomer, and an adhesive between the magnesium containing metal and the thermoplastic elastomer, the adhesive comprising from about 20% to about 99% by weight of a polymeric material.

15 Claims, No Drawings

BONDING A THERMOPLASTIC ELASTOMER TO A MAGNESIUM BASED METAL

FIELD OF THE INVENTION

The invention relates to bonding a thermoplastic elastomer to a magnesium based metal. More specifically, the invention relates to a thermoplastic elastomer strongly bonded to a magnesium containing metal using a specifically defined adhesive.

BACKGROUND OF THE INVENTION

Bonding organic materials such as rubbers and plastics to metals is of great importance. Numerous articles provide a litany of mechanisms and solutions for bonding these distinct materials, with varying degrees of success. This is because different organic materials and metals have unique properties and varying degrees of compatibility.

For example, some organic materials have low energy surfaces while other organic materials have high energy surfaces. Some organic materials have plastic properties while other organic materials have elastomeric properties. Some organic materials have good heat resistance while other organic materials have poor heat resistance. Some organic materials have a high melt index while other organic materials have a low melt index. Organic materials may have different atoms which affect bonding properties, such as nitrogen containing materials, oxygen containing materials, silicon containing materials, halogen containing materials, sulfur containing materials, and so on.

Metals and metal alloys (collectively termed metals) possess varying characteristics. Metals vary in hardness/softness, corrosion resistance, toughness, wear resistance, resistance to chemical attack, tensile strength, types of oxides formed, and so on. With specific regard to magnesium, it is much more reactive than many other metals. Magnesium has a high sensitivity to salts such as chlorides. Magnesium also easily and quickly oxidizes. Magnesium oxide, formed by oxidation on a magnesium surface, is a very difficult surface on which to form a strong bond with other materials. Extreme care must be exercised with magnesium as fire and explosion hazards are associated with magnesium dust.

There are seemingly endless permutations of organic materials, and metals, all of which inherently have varying characteristics and properties. Improved bonding between specific types of organic materials and metals is therefore desired.

Furthermore, bonding organic materials to metals typically involves initially contacting the metal surface with a primer prior to joining the organic material with the metal. The primer serves improve adhesion between an adhesive and the metal. The primer, which strongly bonds with the adhesive, more strongly bonds to the metal than the adhesive. However, the use of a primer is not only time consuming, but also expensive. The use of additional chemicals such as primers and associated solvents presents disposal concerns and toxicity concerns. Bonding organic materials to metals without the need of a primer is therefore also desired.

Products made of an organic material bonded to a metal are used in many environments. Many of these products are used in harsh manufacturing environments. Manufacturing environments involve drastic and sudden changes in temperature and humidity, shock resistance (for example, to absorb the shock of a drop on concrete from a height of four feet), the ability to absorb vibrational movement, and resistance to petroleum based products, water-based cutting fluids, and industrial chemicals and solvents. There is a desire for products having organic materials to metals that maintain their integrity over time even in a manufacturing environment.

SUMMARY OF THE INVENTION

In one embodiment, the present invention relates to a bonded assembly made of a magnesium containing metal comprising at least about 25% by weight magnesium, a thermoplastic elastomer, and an adhesive between the magnesium containing metal and the thermoplastic elastomer, the adhesive comprising from about 20% to about 99% by weight of a polymeric material.

In another embodiment, the present invention relates to a bonded assembly made of a magnesium containing metal comprising from about 50% to about 99% by weight of magnesium and from about 1% to about 50% by weight of a non-magnesium metal, an olefinic thermoplastic elastomer, and an adhesive between the magnesium containing metal and the thermoplastic elastomer, the adhesive comprising from about 20% to about 99% by weight of at least one polymeric material and from about 1% to about 80% by weight of at least one polymeric complimentary material.

In yet another embodiment, the present invention relates to an apparatus made of a magnesium containing metal comprising from about 50% to about 99% by weight of magnesium and from about 1% to about 50% by weight of a non-magnesium metal, a chlorinated olefinic thermoplastic elastomer, and a heat activated solvent based adhesive between the magnesium containing metal and the thermoplastic elastomer, the adhesive comprising from about 20% to about 99% by weight of a halogenated polyolefin and from about 1% to about 80% by weight of at least one polymeric complimentary material.

In still yet another embodiment, the present invention relates to a method of making a bonded assembly involving applying an adhesive to at least a portion of a magnesium containing metal to provide an adhesive coated metal, the adhesive comprising from about 20% to about 99% by weight of a polymeric material and the magnesium containing metal comprising at least about 25% by weight magnesium, and contacting the adhesive coated metal with a thermoplastic elastomer under sufficient pressure for a sufficient period of time to bond the thermoplastic elastomer to the adhesive coated metal.

DETAILED DESCRIPTION OF THE INVENTION

The present invention relates to effectively bonding thermoplastic elastomers to a magnesium containing metal. The thermoplastic elastomers maintain strong adhesion to magnesium containing metals over time even in harsh environments, where drastic and sudden changes in temperature and humidity, shock resistance, the ability to absorb vibrational movement, and resistance to petroleum based products, water-based cutting fluids, and industrial chemicals and solvents are encountered. While not being bound by any specific mechanism or theory, it is speculated that the adhesive containing a polymeric material strongly bonds to both thermoplastic elastomers and magnesium containing metals.

Magnesium containing metals include pure magnesium, substantially pure magnesium, and magnesium alloys. Magnesium alloys contain at least about 25% by weight magnesium. In one embodiment, magnesium alloys contain at least about 50% by weight magnesium. In another embodiment, magnesium alloys contain at least about 75% by weight magnesium. In yet another embodiment, magnesium alloys contain at least about 85% by weight magnesium.

Magnesium alloys contain magnesium and one or more of an alkali metal, an alkaline earth metal, a transition metal, a rare earth metal, other metals and certain non-metals. General examples of magnesium alloys are alloys containing magnesium and one or more of aluminum, chromium, cobalt, copper, iridium, iron, gold, manganese, nickel, rare earth metals such as lanthanum, cerium, praseodymium, neodymium, promethium, samarium, europium, gadolinium, terbium, dysprosium, holmium, erbium, thulium, ytterbium and lutetium, palladium, platinum, scandium, silicon, silver, tin, titanium, yttrium, zinc and zirconium. Specific examples of magnesium alloys include the following ASTM designations: AM 100A; AZ63A; AZ81A; AZ91C,E; AZ92A; EZ23A; QE22A; WE43A; WE54A; ZE41A; ZE63A; ZK51A; ZK61A; AM50A; AE42X1; AM60A,B; AS41A,B; AZ91B,D; AZ31B,C; AZ61A; AZ80A; and ZK60A.

In one embodiment, the magnesium containing metal contains from about 25% to about 100% by weight of magnesium and from 0% to about 75% by weight of one or more non-magnesium compounds, such as one or more of an alkali metal, an alkaline earth metal (but not magnesium), a transition metal, a rare earth metal, other metals and certain non-metals. In another embodiment, the magnesium containing metal contains from about 50% to about 99% by weight of magnesium and from about 1% to about 50% by weight of one or more non-magnesium compounds or metals, such as from about 1% to about 50% by weight of aluminum. In yet another embodiment, the magnesium containing metal contains from about 75% to about 98% by weight of magnesium and from about 2% to about 25% by weight of one or more non-magnesium compound, such as from about 2% to about 25% by weight of aluminum, zinc and manganese.

In one embodiment, a primer is not applied to the magnesium containing metal prior to bonding with the thermoplastic elastomer using an adhesive as defined below. In another embodiment, a paint is not applied to the magnesium containing metal in order to increase bond strength prior to bonding with the thermoplastic elastomer using an adhesive. The present invention provides a bonded assembly wherein minimal processing of the magnesium containing metal prior to bonding is possible.

In many embodiments, it is preferable to clean at least the bonding surface of the magnesium containing metal prior to bonding with the thermoplastic elastomer. Cleaning may be conducted by at least one of a water-rinse, deionized water rinse, a dilute acid wash, and a mild acid wash. Any mineral or organic acid may be employed to wash the metal surface, so long as the surface of the magnesium containing metal is not substantially degraded or damaged.

In one embodiment, the magnesium containing metal is contacted with a chromate solution prior to bonding with the thermoplastic elastomer using an adhesive as defined below. A chromate solution contains water and chromate ions. The chromate solution does not deposit any substantial amount of a coating on the magnesium containing metal, but it does alter the surface via oxidation. Contact is accomplished by spraying or dipping the magnesium containing metal in a chromate solution. Chromate may be derived from a number of sources including chromic acid, sodium dichromate, potassium chromate and magnesium chromate. In one embodiment, the concentration of chromate in the chromate solution is from about 0.1 g/l to about 25 g/l. In another embodiment, the concentration of chromate in the chromate solution is from about 1 g/l to about 5 g/l. In one embodiment, the magnesium containing metal is in contact with the chromate solution from about 2 seconds to about 2 minutes, preferably from about 5 seconds to about 1 minute, and more preferably from about 10 seconds to about 30 seconds.

The chromate solution may further contain additives including at least one of hybrofluozirconic acid and fluoroboric acid. In some embodiments, contacting the magnesium containing metal with the chromate solution facilitates strong adhesion between the adhesive and the magnesium containing metal.

Thermoplastic elastomers are occasionally referred to as synthetic rubbers, but are more accurately referred to as elastoplastics. Thermoplastic elastomers are polymeric materials having both plastic and elastomeric properties. In one embodiment, the thermoplastic elastomers include olefinic thermoplastic elastomers and chlorinated thermoplastic elastomers. In a preferred embodiment, the thermoplastic elastomers include chlorinated olefinic the oplastic elastomers. General examples of olefinic thermoplastic elastomers, chlorinated thermoplastic elastomers, and chlorinated olefinic thermoplastic elastomers include polyolefines, polyvinylchloride-nitrile rubber blends such as polyvinylchloride-acrylonitrile-butadiene elastomer blends, polyvinylchloride-copolyester elastomer blends, polyvinylchloride-polyurethane elastomer blends, polychloroprenes, and chlorinated polyethylenes. Random, block, and graft copolymers of any of one or more thereabove also constitute thermoplastic elastomers in accordance with the present invention.

Polyolefins include polymer and copolymers of monoolefins having from 2 to about 20 carbon atoms and more preferably from 2 to about 12 carbon atoms per molecule. Monoolefins useful for making polyolefins preferably contain a terminal olefin bond and these include ethylene, propylene, 1-butene, 1-pentene, 4-methyl-1-pentene, 3-methyl-1-butene, 1-octene, 1-decene and 4-ethyl-1-hexene. Examples of such homopolymers include polyethylene (including low density, medium density, high density, linear low density and ultralow density polyethylene), polypropylene (including low density, high density and isotactic polypropylene), poly-1-butene, poly-3-methyl-1-butene and poly-4-methyl-1-pentene. Copolymers including ethylene and higher olefins such as propylene are preferred. Polyolefin copolymers include a polyolefin and another polymeric material such as polystyrene, isoprene, and butadiene.

In one embodiment, the thermoplastic elastomers used in accordance with the present invention are melt processable rubbers. The thermoplastic elastomers can thus be made using general-purpose thermoplastic equipment including injection molding machines, extruders, calendars, and the like. In one embodiment, the thermoplastic elastomers used in accordance with the present invention are single phase polymer systems. In another embodiment, the thermoplastic elastomers used in accordance with the present invention aresubstantially amorphous polymer systems.

In one embodiment, the thermoplastic elastomer comprises a melt processible, thermoplastic elastomeric blend of an ethylene copolymer and a vinyl or vinylidene halide polymer. In one specific embodiment, is partially crosslinked, thermoplastic, melt-processible, elastomeric blend of (a) a copolymer of ethylene, one or more ethylenically unsaturated organic monomers preferably other than an unsaturated carboxylic acid, and optionally at least one additional monomer of an ethylenically unsaturated $C_3$–$C_{20}$ carboxylic acid, carbon monoxide, and sulfur dioxide; and (b) between about 5% and about 75% by weight, based on the entire blend, of a vinyl or vinylidene halide polymer wherein the comonomer content in (a) is such that the ethylene copolymer is compatible with the vinyl or vinylidene halide polymer.

In another specific embodiment, is partially crosslinked, thermoplastic, melt-processible, elastomeric blend of (a) a copolymer of ethylene and one or more ethylenically unsaturated organic monomers of esters of unsaturated $C_3$–$C_{20}$ mono- or dicarboxylic acids, vinyl esters of saturated $C_2$–$C_{18}$ carboxylic acids, vinyl alkyl ethers wherein the alkyl group has about 1 to about 18 carbon atoms, vinyl or vinylidene halides, acrylonitrile, methacrylonitrile, norbornene, alpha-olefins of about 3 to about 12 carbon atoms, and vinyl aromatic compounds and (b) between about 5% and about 75% by weight, based on the blend, of a vinyl or vinylidene halide polymer wherein the comonomer content in (a) is such that the ethylene copolymer is compatible with the vinyl or vinylidene halide polymer; the blend preferably (but not necessarily) not containing a polymerizable polyunsaturated compound or polymer of such compound.

The ethylene copolymers useful in this embodiment can be represented as having the formula E/X/Y, where E is an ethylene polymer, X is an ethylenically unsaturated organic monomer preferably other than an unsaturated carboxylic acid, and Y is an ethylenically unsaturated carboxylic acid, carbon monoxide, or sulfur dioxide. Examples of the organic monomers include one or more of esters of said unsaturated mono- or dicarboxylic acids, vinyl esters of saturated carboxylic acids where the acid group has from about 2 to about 18 carbon atoms, vinyl alkyl ethers wherein the alkyl group has from 1 to about 18 carbon atoms, vinyl or vinylidene halides, acrylonitrile, methacrylonitrile, norbornene, alpha-olefins having from about 3 to about 12 carbon atoms, and vinyl aromatic compounds. Preferred organic monomers include methyl acrylate, butyl acrylate and vinyl acetate.

For the purpose of this invention, the term "polymerizable, polyunsaturated compound" means a non-polymeric compound having two or more polymerizable double bonds, such as, e.g., triallyl cyanurate. Preferred organic monomers which can be copolymerized with ethylene include methyl acrylate, butyl acrylate and vinyl acetate. Of course, more than one organic monomer may be copolymerized with ethylene to form the ethylene copolymer useful in the practice of the subject invention. In these embodiments, the melt index range for these copolymers is 0.1 to 1000 (ASTM D-1 238), and preferably 1 to 100.

The ethylene copolymers preferably have sufficient comonomer copolymerized therein to exhibit compatability with the vinyl and vinylidene halide polymers described below. Generally speaking, copolymers having a comonomer content of greater than 45% based on the weight of the copolymer are particularly useful. A more detailed discussion of the compatability of these ethylene copolymers with vinyl and vinylidene halide polymers, as well as a discussion of the preparation of the copolymers can be found in *Polymer-Polymer Miscibility*, O. Olabisi, L. M. Robeson and M. T. Shaw, Academic Press, N.Y., N.Y., 1979, U.S. Pat. No. 3,684,778 and U.S. Pat. No. 3,780,140, all of which are incorporated by reference herein.

The ethylene copolymers in these specific embodiments are blended with about 5% to about 75%, preferably with about 20% to about 60%, by weight based on the blended composition of vinyl or vinylidene halide polymers including copolymers resulting from copolymerization with a comonomer of vinyl esters, acrylonitrile, acrylic esters, vinylidene chloride, vinyl chloride, esters of unsaturated carboxylic acids and vinyl ethers. For example, polyvinyl chloride having an inherent viscosity of 0.30 to 1.4 (ASTM D-1243) is generally useful.

The blending of the ethylene copolymer with the vinyl or vinylidene halide polymer is accomplished by any one of a number of suitable techniques, for example, in a Banbury mixer, two-roll mill or extruder. Blending is conducted at a temperature suitably high enough to soften the polymers for adequate blending, but not so high as to degrade the vinyl or vinylidene halide polymer. Generally speaking, blending temperatures range from about 140° C. to about 200° C., and blending is carried out for a time sufficient to homogeneously blend the components.

One aspect of these specific embodiments is the partial crosslinking of the ethylene copolymer in the compatible blend. This can be carried out using any one or more of the well known crosslinking techniques including electron beam irradiation, gamma irradiation and free radical curatives such as peroxides and/or azo compounds. The crosslinking of the ethylene copolymer can be carried out before or concurrently with blending with the vinyl or vinylidene halide polymers, or after such blending when using radiation techniques to effectuate the crosslinking.

If the ethylene copolymer in the blend contains carbon monoxide, diamines such as methylene dianiline or p-phenylene diamine can be used to effectuate the desired crosslinking. If the ethylene copolymer is ethylene/vinyl acetate/carbon monoxide, sulfur vulcanizing agents can be used as detailed in U.S. Pat. No. 4,172,939, which is incorporated by reference for its relevant teachings. For crosslinking ethylene copolymers containing carboxylic acid functionalities, the formation of ionic crosslinks is suitable, and is achieved with various metal oxides or hydroxides such as ZnO and NaOH, or with organometallics such as chromium acetylacetone, as detailed in U.S. Pat. No. 4,304,887, which is incorporated by reference for its relevant teachings.

When crosslinking is effected in the presence of a free radical generator, it is preferable, although not required, to add a polyunsaturated compound to the blend, such as m-phenylene-bis-maleimide or triallyl cyanurate, to improve the crosslinking efficiency and to reduce the amount of free radical generator required. When other crosslinking methods are employed, such as curing with diamines, sulfur, or metal compounds, such polyunsaturated compounds are not used.

The term "partially crosslinked" refers to a degree of crosslinking sufficient to transform a blend of an ethylene copolymer and a vinyl or vinylidene halide polymer into a thermoplastic elastomeric blend. To quantify the degree of crosslinking, the amount of insoluble, and hence crosslinked, polymer is determined by soaking a sample of the polymer, after crosslinking, in tetrahydrofuran at about 23° C. for about 16 hours, isolating the insoluble portion and weighing the dried residue, making suitable corrections based upon knowledge of the composition. For example, the weight of components soluble in tetrahydrofuran such as plasticizers are subtracted from the initial weight; and components insoluble in tetrahydrofuran, such as pigments, fillers, etc. are subtracted from both the initial and final weight. The insoluble polymer recovered is reported as percent gel content. This procedure is based on a conventional procedure for quantifying degree of crosslinking that is more fully detailed in U.S. Pat. No. 3,203,937, which is hereby incorporated by reference in this regard. The polymer blends are preferably partially crosslinked so that they have a gel content from about 5% to about 90%, preferably from about 10% to about 70% based on the total polymer. The conditions under which this crosslinking is carried out, i.e., type and quantity of crosslinking agent, crosslinking time and temperature, to arrive at a composition having a gel content within this preferable range, can be determined empirically by one skilled in the art. When chemical crosslinking agents are utilized, it is preferable that they be substantially totally consumed during the crosslinking step.

When polyvinyl chloride (PVC) is utilized as the vinyl halide polymer, spectroscopic evidence indicates that the gel fractions isolated from those partially crosslinked polymer blends contain only crosslinked ethylene copolymer, with no or little detectable PVC present. Although not wishing to be bound by any theory, it is believed that essentially no crosslinking of the PVC occurs.

In a preferred embodiment, the thermoplastic elastomers are melt processible using conventional plastic processing equipment. Articles molded from the unique thermoplastic elastomers of the present invention exhibit properties generally only associated with vulcanized rubber. For example, the thermoplastic elastomers have resistance to compression set values of about 20% to about 70% (about 70° C. to about 100° C.); and elongation at break values of about 150% to about 600% without substantial permanent tensile set (i.e., less than about 15%).

In a most preferred embodiment, the thermoplastic elastomer comprises a partially crosslinked chlorinated olefin interpolymer alloy (with compounds described below). In this connection, thermoplastic elastomer in one embodiment comprises an alloy of a polyolefin such as ethylene and a chlorinated polyolefin wherein the olefin polymer component is partially crosslinked in situ. Such thermoplastic elastomers are commercially available under the trade designation Alcryn® from DuPont/Advanced Polymer Alloys under the designators Series 1000, Series 2000, Series 3000, and Series 4000.

Various additives, alloying compounds, blending compounds and/or compounding materials are optionally incorporated into the thermoplastic elastomer composition. Additives including plasticizers, UV stabilizers, antioxidants, adhesion promoters, rheology modifiers, antiozoants, dyes, calcium carbonate, carbon black, clays, colorants, tackifiers, lubricants, waxes, and non-reinforcing fillers.

The thermoplastic elastomers optionally contain alloying compounds, blending compounds and compounding materials such as natural and synthetic rubbers, thermoplastics, thermosets, other thermoplastic elastomers such as styrenic thermoplastic elastomers, polyester thermoplastic elastomers, polyamide thermoplastic elastomers, and polyurethane thermoplastic elastomers. In one embodiment, natural and synthetic rubbers are optionally incorporated into the thermoplastic elastomer. Natural and synthetic rubbers, such as nitrile rubber, contribute to the oil resistance of thermoplastic elastomers. In a preferred embodiment, the thermoplastic elastomers are a blend of two or more polymeric materials.

Additional examples of commercially available thermoplastic elastomers include those under the trade designation Telcar® from B.F. Goodrich; those under the trade designation TPR® from Uniroyal; those under the trade designation Somel® and Hytrel® from DuPont; those under the trade designation Profax® from Hercules; those under the trade designation RTP 2800 Series Compounds from RTP Co. under the designators RTP 2801-40D, RTP 2802-40D, ESD A 2800 and ESD C 2800; those under the trade designation Multi-Flex® from Multibase, Inc. under the designators Multi-Flex TPE® and Multi-Flex TPO; those under the trade designation Dynaflex® and Versaflex™ from GLS Corporation.

Olefinic thermoplastic elastomers are described in U.S. Pat. Nos. 5,856,399; 5,847,052; 5,786,403; 5,728,744; 5,702,827; 5,596,042; 5,552,482; 5,449,711; 5,349,005; 5,191,005; 4,985,497; 4,933,389; 4,908,412; 4,833,194; and 4,340,684; and these disclosures are incorporated herein for there descriptions of olefinic thermoplastic elastomers. Chlorinated olefinic thermoplastic elastomers are described in U.S. Pat. Nos. 5,728,772; 5,717,028; 5,387,648; 5,314, 941; 5,286,795; 5,270,381; 5,237,010; 4,978,716; 4,978, 703; 4,910,245; 4,739,012; 4,728,692, 4,627,993; and 4,613,533; and these disclosures are incorporated herein for there descriptions of chlorinated olefinic thermoplastic elastomers.

A suitable amount of an adhesive is applied to at least one of the thermoplastic elastomer and the magnesium containing metal, then the thermoplastic elastomer is contacted with the magnesium containing metal. The adhesive forms a strong bond between the thermoplastic elastomer and the magnesium containing metal, despite the environment.

Generally speaking the adhesive is applied to at least one of the thermoplastic elastomer and the magnesium containing metal by brushing, spraying, or dipping. Optionally, heat and/or pressure is applied to facilitate formation of a strong bond between the thermoplastic elastomer and the magnesium containing metal.

The adhesive is preferably applied via a solvent of diluent wherein a film is formed on at least one of the thermoplastic elastomer and the magnesium containing metal. In one embodiment, the adhesive film thickness is from about 0.01 mils to about 20 mils. In another embodiment, the adhesive film thickness is from about 0.1 mils to about 10 mils. in yet another embodiment, the adhesive film thickness is from about 0.5 mils to about 2 mils.

In one embodiment, the temperature at which the thermoplastic elastomer and the magnesium containing metal are bonded or brought together is from about 20° C. to about 300° C. In another embodiment, the temperature at which the thermoplastic elastomer and the magnesium containing metal are bonded is from about 50° C. to about 250° C. In yet another embodiment, the temperature at which the thermoplastic elastomer and the magnesium containing metal are bonded is from about 100° C. to about 200° C. In the specific embodiment where the thermoplastic elastomer is Alcryn®, the bonding temperature is from about 170° C. to about 180° C.

In one embodiment, the pressure under which the thermoplastic elastomer and the magnesium containing metal are bonded is from about 500 psi to about 6,000 psi. In another embodiment, the pressure under which the thermoplastic elastomer and the magnesium containing metal are bonded is from about 1,000 psi to about 5,000 psi. In yet another embodiment, the pressure under which the thermoplastic elastomer and the magnesium containing metal are bonded is from about 2,000 psi to about 4,500 psi.

In one embodiment, the time under which pressure is applied to the thermoplastic elastomer and the magnesium containing metal for bonding is from about 1 second to about 1 minute. In another embodiment, the time under which pressure is applied to the thermoplastic elastomer and the magnesium containing metal for bonding is from about 2 seconds to about 30 seconds. In yet another embodiment, the time under which pressure is applied to the thermoplastic elastomer and the magnesium containing metal for bonding is from about 3 seconds to about 15 seconds.

In one embodiment, the adhesive is preferably a heat-activated solvent based adhesive. An example of a commercially available adhesive in accordance with the present invention include those under the trade designation Chemlok® from Lord Corp.; and specifically those under the designators Chemlok® and Chemlok® Curative 44.

Suitable adhesives in accordance with the present invention include those described in U.S. Pat. Nos. 5,268,404; 5,051,474; 5,019,608; 4,857,131; and 4,119,587; and these disclosures are incorporated herein for there descriptions of adhesives.

The adhesive contains a polymeric material. The polymeric material contains at least one of a halogenated polymer, such as a halogen containing polyolefin, a butadiene polymer latex, and a polyester polyurethane. In one embodiment, the adhesive contains from about 20% to about 99% by weight of one or more polymeric materials. In another embodiment, the adhesive contains from about 30% to about 97% by weight of one or more polymeric materials. In another embodiment, the adhesive contains from about 40% to about 95% by weight of one or more polymeric materials.

The adhesive further contains at least one polymeric complimentary materials. Polymeric complimentary materials include at least one of an aromatic-nitroso compound, a lead acid or metal oxide, a maleimide compound, a vulcanization agent, a phenolic epoxy resin, a phenolic resin, a crosslinking compound, a methylene donor compound, various organic solvents and/or diluents, and water. In one embodiment, the adhesive contains from about 1% to about 80% by weight of one or more polymeric complimentary materials. In another embodiment, the adhesive contains from about 3% to about 70% by weight of one or more polymeric complimentary materials. In yet another embodiment, the adhesive contains from about 5% to about 60% by weight of one or more polymeric complimentary materials.

Next, four specific embodiments of the adhesive are described in detail. The first three embodiments are solvent based adhesives that may also be used as heat-activated solvent based adhesives. The fourth embodiment is an aqueous based adhesive. The solvent based adhesives are preferred.

In one embodiment, the adhesive is an organic solvent based adhesive and contains at least one halogenated polymer, at least one aromatic nitroso compound; at least one lead salt of certain organic and/or inorganic acids; and, optionally, at least one maleimide compound. In this embodiment, the aromatic nitroso compound is present in an amount in the range from about 1 to about 200, preferably from about 10 to about 100, parts by weight per 100 parts by weight of the halogen-containing polyolefin. The amount of lead salt is normally in the range from about 10 to about 150 parts, preferably from about 25 to about 100, and most preferably from about 35 to about 75, parts by weight per 100 parts by weight of the halogen-containing polyolefin.

The herein-described adhesive compositions can be compounded with an appropriate inert solvent or diluent to provide an adhesive lacquer having a total solids content (TSC) in the range from about 5% to about 80%, preferably about 15% to about 40%. Alternatively, the adhesive compositions can be provided at 100% TSC in the form of an adhesive film or tape. If desired, conventional additives such as are normally used in adhesive compositions can be included with the amount of such additives being within the ranges conventionally employed.

Optionally, there can be incorporated into the adhesives from about 0.5 to about 25, preferably from about 2 to about 20, parts by weight, per 100 parts by weight of the halogen-containing polymer, of at least one maleimide compound. The use of such maleimide compounds in the adhesives contributes to augment environmental resistance in particularly aggressive or harsh environments.

The halogen-containing polymers are halogen-containing natural and synthetic polyolefinic elastomers. The halogens employed in the halogenated polyolefinic elastomers are usually chlorine or bromine, although fluorine can also be used. Mixed halogens can also be employed in which case the halogen-containing polyolefin has more than one halogen substituted thereon. The amount of halogen is not critical and can range from as low as about 3% by weight to more than about 70% by weight, depending on the nature of the base polymer.

Halogen-containing polyolefinic elastomers and their preparation are known in the art. Representative halogen-containing polyolefinic elastomers include chlorinated natural rubber, chlorine- and bromine-containing synthetic rubbers including polychloroprene, chlorinated polychloroprene, chlorinated polybutadiene, chlorinated butadienestyrene copolymers, chlorinated ethylene-propylene copolymers and ethylene/ propylene/non-cojugated diene terpolymers, chlorinated polyethylene, chlorosulfonated polyethylene, brominated poly(2,3-dichloro-1,3-butadiene), copolymers of alphachloroacrylonitrile and 2,3-dichloro-1,3-butadiene, chlorinated poly (vinyl chloride), halogenated copolymers of dissimilar α-olefins having from about 2 to about 8 carbon atoms, and the like, including mixtures of such halogen-containing elastomers. Representative halogen-containing polyolefinic elastomers further include halogenated vinyl halide polymers including halogenated homopolymers or copolymers of vinyl halide. These halogenated materials can be made by post-halogenating the vinyl-halide resin, preferably by post-chlorinating polyvinylchloride. Such materials are commercially available under the trade designations Genchlor S and Genchlor T from Imperial Chemical Industries, Ltd. Generally speaking, any of the known halogen-containing derivatives of natural and synthetic elastomers can be employed in the adhesives, including mixtures of such elastomers. In a preferred embodiment, chlorosulfornated polyethylene elastomers alone or in combination with chlorinated natural rubber are employed as halogen-containing film-forming polymers.

The aromatic nitroso compounds are aromatic hydrocarbons, such as benzenes, naphthalenes, anthracenes, biphenyls, and the like, containing at least about two nitroso groups attached directly to non-adjacent ring carbon atoms. More particularly, such nitroso compounds are described as poly-C-nitroso aromatic compounds having from 1 to about 3 aromatic nuclei, including fused aromatic nuclei, having from about 2 to about 6 nitroso groups attached directly to non-adjacent nuclear carbon atoms. Preferred poly-C-nitroso materials are the di-nitroso aromatic compounds, especially the dinitrosobenzenes and dinitrosonaphthalenes, such as the meta- or paradinitrosobenzenes and the meta- or paradinitrosonaphthalenes. The nuclear hydrogen atoms of the aromatic nucleus can be replaced by alkyl, alkoxy, cycloalkyl, aryl, aralkyl, alkaryl, arylamine, arylnitroso, amino, halogen, and the like groups. The presence of such substituents on the aromatic nucleus has little effect on the activity of the poly-C-nitroso compounds in the present invention. The substituents can be organic or inorganic in nature. Thus, where reference is made herein to poly-C-nitroso or di-C-nitroso "aromatic compound", "benzenes", or "naphthalenes", it is understood to include both substituted and unsubstituted nitroso compounds, unless otherwise specified.

In a preferred embodiment, poly-C-nitroso compounds are characterized by the formula (R$^o$)$_m$—Ar—(NO)$_2$, wherein Ar is selected from the group consisting of phenylene and naphthalene: R$^o$ is one or more monovalent organic radicals of alkyl, cycloalkyl, aryl, aralkyl, alkaryl, arylamine and alkoxy radicals having from 1 to about 20 carbon atoms, amino, or halogen, and is preferably an alkyl group having from 1 to about 8 carbon atoms; and m is zero, 1, 2, 3 or 4 and preferably is zero.

A partial listing of suitable poly-C-nitroso compounds include m-dinitrosobenzene, p-dinitrosobenzene, m-dinitrosonaphthalene, p-dinitrosonaphthalene, 2,5-dinitroso-p-cymene, 2-methyl-1,4-dinitrosobenzene, 2-methyl-5-chloro-1,4-dinitrosobenzene, 2-fluoro-1,4-dinitrosobenzene, 2-methoxy-1-3-dinitroso-benzene, 5-chloro-1,3-dinitrosobenzene, 2-benzyl-1,4-dinitrosobenzene, and 2-cyclohexyl-1,4-dinitrosobenzene.

The lead salts are generally polybasic lead salts of phosphorous acid and saturated and unsaturated organic dicarboxylic acids and acid anhydrides. These lead salts are commercially available. Preferred lead salts include dibasic lead phthalate, monohydrous tribasic lead maleate, tetrabasic lead fumarate, and dibasic lead phosphite, and mixtures of two or more thereof. Although not fully understood and not wishing to be bound by any theory, it is believed that the lead salts contribute to environmental resistance, possibly by acting as acid acceptors for acidic materials which may undesirably be present.

Maleimide compounds include all of the maleimide, bismaleimide and related compounds which are described in U.S. Pat. Nos. 2,444,536 and 2,462,835, which disclosures are herein incorporated by reference in this regard. Preferred maleimide compounds include the N,N'-linked bismaleimides which are either joined directly at the nitrogen atoms without any intervening structure or in which the nitrogen atoms are joined to and separated by an intervening divalent radical such as alkylene, cycloalkylene, oxydimethylene, phenylene (all 3 isomers), 2,6-dimethylene-4-alkylphenol, or sulfonyl, m-phenylene-bis-maleimide. A preferred compound is available under the trade designation "HVA-2" from Du Pont.

Instead of a maleimide compound as described in the paragraph above, a polymaleimide compound may be used. The polymaleimide compound is an aliphatic or aromatic polymaleimide and preferably contains at least two maleimide groups. Aromatic polymaleimides having from about 1 to about 100 aromatic nuclei wherein the maleimide groups are directly attached to each adjacent aromatic ring are especially preferred. Particularly preferred polymaleimide compounds have the formula:

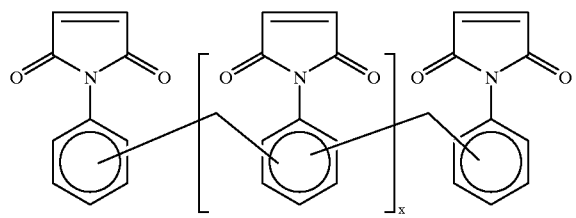

wherein x is from about 1 to about 100. Such polymaleimides are commercially available from a number of sources including under the trade designation BMI-M-20 polymaleimide from Mitsui Toatsu Fine Chemicals, Inc. The amount of polymaleimide compound used in the adhesive may be from about 5 to about 100 parts by weight per 100 parts of the halogen-containing polyolefin and preferably from about 10 to about 60 parts.

The adhesives of this embodiment are prepared by conventional means. For example, the components can be mixed and dispersed in an inert liquid carrier which, once the adhesive is applied to the thermoplastic elastomer or the magnesium containing metal, can be readily evaporated. Examples of suitable carriers are aromatic and halogenated aromatic hydrocarbons such as benzene, ethyl benzene, toluene, xylene, chlorobenzene, dichlorobenzene, and the like; halogenated aliphatic hydrocarbons such as trichloroethylene, perchloroethylene, propylene dichloride, and the like; ketones such as methyl ethyl ketone, methyl isobutyl ketone, and the like; ethers, naphthas, etc., including mixtures of two or more thereof. In a preferred embodiment, the carrier is at least one of xylene and methyl ethyl ketone. The amount of the carrier is not critical, but ordinarily provides a total solids content ranging from about 5% to about 80%, preferably about 15% to about 40% by weight. Alternatively, the adhesives can be compounded as 100% TSC systems which contain no solvent or diluent and provided in the form of an adhesive tape or film.

The adhesives are applied to at least one of the surfaces of the thermoplastic elastomer and/or the magnesium containing metal in a conventional manner such as by dipping, spraying, brushing, and the like. Preferably, the surfaces to which the adhesive is applied is allowed to dry after coating before being brought together for bonding. After the surfaces are pressed together with the adhesive layer therebetween, the assembly of the thermoplastic elastomer and the magnesium containing metal may be heated in accordance with conventional practices. The exact conditions selected depend upon the particular elastomer being bonded and whether or not it is cured. The conditions are generally at a temperature from about 140° C. to about 200° C. for a time from about 5 minutes to about 60 minutes. Alternatively, the bonding temperature may range from about 90° C. to above about 180° C. for a time from about 15 minutes to about 120 minutes. Alternatively, in situations where applicable, the adhesives can be interspersed between the surfaces to be joined as a solid film or tape (100% TSC adhesive system) with bonding being accomplished as before.

In a second embodiment, the adhesive is an organic solvent based adhesive and contains a one-coat rubber-to-metal adhesive containing at least one halogen-containing polyolefin; from about 1 to about 200 parts by weight, per 100 parts by weight of the halogen-containing polyolefin, of at least one aromatic nitroso compound; from about 10 to about 120 parts by weight per 100 parts by weight of the halogen-containing polyolefin of at least one metal oxide of zinc oxide and magnesium oxide; from zero to about 25 parts by weight, per 100 parts by weight of the halogen-containing polyolefin, of at least one maleimide compound; from zero to about 40 parts by weight, per 100 parts by weight of the halogen-containing polyolefin, of at least one vulcanizing agent of sulfur and selenium; from zero to about 80 parts by weight, per 100 parts by weight of the halogen-containing polyolefin of a phenolic epoxy resin; and an inert diluent, the diluent being present in an amount to provide a lacquer type composition suitable for use as an adhesive. the lacquer having a total solids content in the range from about 5% to about 80%.

Halogen-containing polyolefins, nitroso compounds, maleimide compounds, and diluents are the same as those described in the embodiment above, and thus they are not repeated here.

The metal oxides include one or more of zinc oxide and magnesium oxide. These metal oxides are commercially available. Although not fully understood and not wishing to be bound by any theory, it is believed that the metal oxides contribute to environmental resistance, possibly by acting as an amphoteric material, reacting with acids to form salts, thereby acting as an acid scavenger. Furthermore, such metal oxides are known curing activators in the vulcanization of rubber. When using such metal oxides, it is not generally necessary to employ lead containing compounds, thus this embodiment provides a lead-free adhesive. The amount of metal oxide used in the adhesive may be from about 10 to about 120 parts by weight per 100 parts of polyolefin and preferably from about 12 to about 80 parts.

The vulcanizing agents include at least one of sulfur and selenium. The vulcanizing agents are commercially available. The amount of vulcanizing agent used in the adhesive may be from 0 to about 40 parts by weight per 100 parts of the halogen-containing polyolefin and preferably from about 5 to about 30 parts. The metal oxide component and the vulcanizing agent component of the adhesive composition are added in finely divided form or as a dispersion in a suitable liquid carrier.

Phenolic epoxy resins generally include the polyglycidyl polyethers of polyhydric phenols. These phenolic-epoxy resins are complex polymeric reaction products of polyhydric phenols with polyfunctional holohydrins and/or glycerol dichlorohydrin. The products thus obtained contain terminal epoxy groups. A large number of epoxy resins of this type are disclosed in U.S. Pat. Nos. 2,585,115 and 2,589,245, which are hereby incorporated by reference for there disclosure of phenolic-epoxy resins. Several of these resins are commerically available.

Typical polyhydric phenols useful in the preparation of the phenolic epoxy resins include resorcinal and novolac resins resulting from condensation of phenol with formaldehyde. The phenol/formaldehyde molar ratio, coupled with the type of catalyst, determines whether the resulting polymer is phenol terminated or methylol terminated; phenol-terminated are referred to as novolacs. These are produced from a reaction mixture having a formaldehyde/phenol molar ratio between about 0.5 and about 0.8 in the presence of an acid catalyst. Resorcinal is a very reactive dihydric phenol with formaldehyde, allowing for the preparation of resorcinal-formaldehyde novolacs.

A typical phenolic epoxy resin prepared from the novolac resins and epichlorohydrin has the following structural formula:

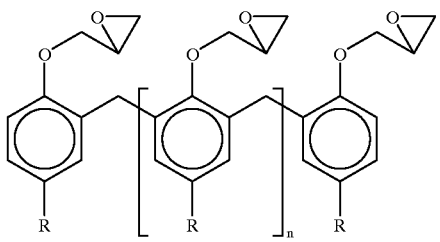

In which R is hydrogen or an alkyl group having from 1 to about 4 carbon atoms and n has a range from 1 to about 8.

Phenolic epoxy resins may be further characterized by reference of their epoxy weight of pure epoxy resins being the mean molecular weight of the resin divided by the mean number of epoxy radicals per molecule or in any case the number of grams of epoxy resin equivalent to one mole of the epoxy group or one gram equivalent of epoxide. The phenolic epoxy resins that may be used in this embodiment have an epoxy equivalent weight from about 400 to about 1000. The amount of phenolic epoxy resins used in the adhesive may be from 0 to about 80 parts by weight per 100 parts by weight of the the halogen-containing polyolefin, and preferably from about 2 to about 50 parts.

In a third embodiment, the adhesive contains two components and is an organic solvent based adhesive. The first component of the adhesive in this embodiment comprises a linear polyester polyurethane, a halogenated polyolefin and a phenolic resin. Halogen-containing polyolefins or halogenated polyolefin and diluents are the same as those described in the embodiments above, and thus they are not repeated here.

The linear polyester polyurethanes are typically prepared by reacting isocyanate-functional urethane polyester prepolymers with low molecular weight chain extending diols employing conventional techniques known in the art. An extensive description of some of the useful techniques for preparing polyester urethane prepolymers can be found in Saunders and Frisch: "Polyurethanes, Chemistry and Technology," Part II, Interscience, (New York 1964), especially at pages 8 to 49, and in the references cited therein. Other preparative techniques which are known in the art can also be employed.

More specifically, the linear polyester polyurethanes which can be employed in the adhesive of this embodiment typically are prepared by reacting at least one linear polyester having two active hydrogen atoms with a diisocyanate in order to form an isocyanate-functional urethane polyester prepolymer. The urethane polyester prepolymer is then reacted with a low molecular weight chain extending diol in order to prepare the linear polyester polyurethane.

The hydrogen atom-containing linear polyesters used to produce the polyurethanes are generally hydroxy-terminated polyesters having an average molecular weight in the range from about 500 to about 4000. The linear polyesters are typically formed from bifunctional monomers having either aliphatic or aromatic segments therein. For example, the linear polyesters may be formed by reacting polyhydric alcohols with polycarboxylic acids in hydroxyl:carboxyl ratios ranging from about 2:1 to about 15:14. Exemplary linear polyesters useful for forming the polyurethanes include condensation products of adipic acid or terephthalic acid with 1,4-butane diol or ethylene glycol.

Any diisocyanates having two reactive isocyanate groups can be reacted with the linear polyester in order to create the isocyanate-functional urethane polyester prepolymers. Such diisocyanates include diisocyanates such as 1,6-hexamethylene diisocyanate; 1,8-octomethylene diisocyanate; 1,12-dodecamethylene diisocyanate; 2,2,4-trimethylhexamethylene diisocyanate and similar isocyanates; 3,3'diisocyanatodipropyl ether; 3-isocyanatomethyl-3,5,5'-trimethylcyclohexyl isocyanate; cyclopentalene-1,3-diisocyanate; cyclohexylene-1,4-diisocyanate; methyl 2,6-diisocyanatocaprolate; bis-(2-isocyanatoethyl)-fumarate; 4-methyl-1,3-diisocyanatocyclohexane; trans-vinylene diisocyanate and similar unsaturated polyisocyanates; 4,4'-methylene-bis-(cyclohexylisocyanate) and related polyisocyanates; methane diisocyanates; bis-(2-isocyanatoethyl) carbonate and similar carbonate polyisocyanates; N,N'N-tris-(6-isocyanatohexamethylene) biuret and related polyisocyanates as well as other known polyisocyanates derived from aliphatic polyamines; toluene diisocyanates; xylene-diisocyanates; dianisidine diisocyanate; 4,4'-diphenylmethane diisocyanate; 1-ethoxy-2,4-diisocyanatobenzene; 1-chloro-2,4-diisocyanatobenzene; tris(4-isocyanatophenyl) methane; naphthalene diisocyanates; 4,4'-biphenyl diisocyanate; phenylene diisocyanates; 3,3'-dimethyl-4,4'-biphenyl diisocyanate; p-isocyanatobenzoyl isocyanate and tetrachloro-1,3-phenylene diisocyanate and mixtures thereof. Preferred diisocyanates include toluene diisocyanate and diphenylmethane-4,4'-diisocyanate.

The urethane polyester prepolymer is reacted with low molecular weight chain extending diols as is known in the art to produce the final linear polyester polyurethane. Typical chain extending diols include 1,4-butane diol and ethylene glycol.

Generally, the polyurethane employed has a molecular weight of at least about 50,000, but preferably has a molecular weight greater than about 100,000. In a preferred embodiment, the linear polyester polyurethanes are prepared by reacting a linear polyester with toluene diisocyanate and chain extending the prepolymer thus formed with 1,4-butane diol. The urethane preferably has a hydroxyl content of between about 0.08% and about 0.12% and a solution viscosity (15% by weight in methyl ethyl ketone) of between about 400 and about 800 centiposes. The linear polyester polyurethane is utilized in an amount from about 10% to about 99%, preferably from about 60% to about 80% by weight of the first component.

The halogenated polyolefin is normally utilized in an amount from about 0.2% to about 60% by weight, preferably from about 15% to about 30% by weight of the first component.

The phenolic resins generally include phenol-aldehyde condensates. Such resins are prepared according to known methods by condensing phenolic compounds and aldehydes, usually under acidic to neutral conditions. Also included within the purview of phenolic resins are the reaction products obtained by further condensing a formed resole resin with additional phenolic compound. For more detailed information regarding phenolic resins, including methods of preparation, see Carswell "Phenoplasts," lnterscience Publishers, Inc., New York, N.Y., (1947), which treatise is incorporated herein by reference. Suitable phenolic resins include resinous oils as well as pulverulent solids.

In forming the phenolic resins, there can be utilized a variety of phenolic compounds, i.e., both monohydroxy and polyhydroxy phenols, including such compounds having at least one aromatic nucleus, and substituted derivatives thereof, and including mixtures of two or more of such phenolic compounds. Among the substituent groups which can be attached to the nucleus of the phenolic compound are alkyl, alkoxy, amino, halogen and the like. Representative phenolic compounds include phenol, p-t-butylphenol, p-phenylphenol, p-chlorophenol, p-alkoxyphenol, o-cresol, m-cresol, o-chlorophenol, m-bromophenol, 2-ethylphenol, amyl phenol, nonyl phenol, cashew nut shell liquid, resorcinol, orcinol, pyrocatechol, pyrogallol, salicylic acid, bis-phenol A, bis-phenol S, and the like. Preferred phenolic resins are obtained when the phenolic precursors comprise: about 100 mole percent of at least one polyhydroxy phenol such as resorcinol, pyrogallol, catechol and the like; from about 50 to about 98, preferably about 60 to about 98, mole percent of at least one polyhydroxy phenol and from about 50 to about 2, preferably about 40 to about 2, mole percent of at least one monohydric phenol, the nucleus of which is not substituted with a hydrocarbon radical, i.e. a radical containing only carbon and hydrogen atoms, although the nucleus can be substituted with groups such as alkoxy, amino, halogen, and the like; and from about 10 to about 98, preferably about 50 to about 98 mole percent of at least one polyhydroxy phenol and from about 90 to about 2, preferably about 50 to about 2, mole percent of at least one monohydric phenol, the nucleus of which is substituted with at least one alkyl group having from 1 to about 22 carbon atoms; or about 100 mole percent of at least one monohydric phenol, the nucleus of which is substituted with at least one alkyl group having from 1 to about 22 carbon atoms; said mole percent being based on total moles of phenolic compound.

Particularly preferred phenolic resins are obtained by utilizing a mixture of pyrogallol and resorcinol as the phenolic precursors. Specifically, a phenolic resin prepared from a mixture containing from about 1 to about 99, preferably about 20 to about 80 mole percent of pyrogallol and from about 99 to about 1, preferably about 80 to about 20 mole percent of resorcinol provides excellent adhesion.

Representative aldehydes which can be condensed with phenolic compounds to form phenolic resins include formaldehyde, acetaldehyde, propionaldehyde, isobutyraldehyde, 2-ethylbutyraldehyde, glyceraldehyde, 2-methylpentaldehyde, 2-ethylhexaldehyde, as well as compounds which decompose to formaldehyde, such as paraformaldehyde, trioxane, furfural, hexamethylenetetramine, acetals which liberate formaldehyde on heating benzaldehyde, and the like. The preferred aldehyde is formaldehyde. The aldehyde is typically utilized in an amount ranging from about 20 to about 90, preferably from about 40 to about 80 mole percent per 100 mole percent of the total phenolic precursor or precursor mixture to produce the phenolic resin.

The phenolic resin is typically utilized in an amount from about 0.5% to about 20%, preferably from about 2% to about 13% by weight of the first component.

The second component of this embodiment is a cross-linking compound which cross-links or cures the first component. The cross-linking compound can essentially be any material which will effectively cure or cross-link the first component. The cross-linking compound is preferably a diisocyanate compound such as 2,4-toluene diisocyanate, diphenylmethane-4,4'-diisocyanate, p-phenylene diisocyanate, m-phenylene diisocyanate, 1,4-cyclohexyl diisocyanate, tetramethylxylyl diisocyanate and dimethyidiphenyl diisocyanate, with diphenylmethane-4,4'-diisocyanate being the preferred diisocyanate compound. The cross-linker is typically utilized in an amount from about 4 to about 32, preferably from about 8 to about 20 parts by weight per 100 parts by weight of the first component.

A solvent is required to dissolve the respective components. Solvents used for dissolving the first component include polar or aromatic solvents such as methyl ethyl ketone, methyl isobutyl ketone, xylene and toluene, with methyl ethyl ketone and xylene being preferred. The solvent for the first component is utilized in an amount sufficient to provide a component having a total solids content (TSC) of from about 10 to about 50, preferably from about 15 to about 30. A solvent, although not necessary, may be utilized to dissolve the second component. Typical solvents useful for dissolving the second component include halogenated solvents such as 1,1,1-trichloroethane and perchloroethylene with 1,1,1-trichloroethane being preferred. The solvent for the second component is utilized in an amount sufficient to provide a component having a total solids content of from about 1 to about 100, preferably from about 30 to about 60.

The adhesive of this third embodiment can optionally contain other well-known additives. The two components of this embodiment must be stored separately in order to avoid any premature cross-linking or curing of the adhesive. The adhesive is typically applied to at least one of the thermoplastic elastomer and the magnesium containing metal by first mixing the first component and the second component together in the amounts described previously. After the initial mixing, the resulting formulation must be applied within at least about 30 days but preferably within about 2 days in order to avoid a premature increase in viscosity. Most preferably, the formulation is applied immediately after mixing the two components in order to avoid any increase in viscosity which might create problems associated with the corresponding application technique. The formulation may be applied to a desired substrate by techniques known in the art such as by brushing, spraying, or dipping. Preferably, the formulation is applied by dipping or brushing.

In general, after applying the adhesive and allowing it to dry for a period of between about 12 and about 24 hours, the surfaces of the thermoplastic elastomer and the magnesium containing metal to be bonded are brought together under at least about 1 psi/sq. in. of pressure in order to create a permanent bond. Additional heating may be employed but is not required to effect the bonding.

The magnesium containing metal and the thermoplastic elastomer are typically brought together under a pressure from about 500 psi to about 5,000 psi, preferably from about 2,000 psi to about 4,500 psi. Additional heating may be provided but is not required for the adhesive of the invention to sufficiently bond the thermoplastic elastomer to the magnesium containing metal. After the thermoplastic elastomer and magnesium containing metal are brought together, the elastomer-magnesium containing metal assembly is preferably allowed to cool for a period of from about 12 hours to about 24 hours in order to ensure sufficient cross-linking of the adhesive.

In a fourth embodiment, the adhesive is an aqueous based adhesive and contains a polyvinyl alcohol stabilized butadiene polymer latex in combination with a methylene donor compound. The butadiene latices can be prepared by polymerizing appropriate monomers in an aqueous solution of polyvinyl alcohol. The butadiene polymer of this embodiment can be prepared from butadiene monomers alone or from a combination of butadiene monomers and other copolymerizable monomers described in more detail below. Butadiene polymer as used herein refers to butadiene homopolymers, butadiene copolymers, butadiene terpolymers and higher polymers.

The butadiene monomers useful for preparing the butadiene polymer of the latex can essentially be any monomer containing conjugated unsaturation. Typical monomers include 2,3-dichloro-1,3-butadiene; 1,3-butadiene; 2,3-dibromo-1,3-butadiene; isoprene; 2,3-dimethylbutadiene; chloroprene; bromoprene; 2,3-dibromo-1,3-butadiene; 1,1,2-trichlorobutadiene; cyanoprene; hexachlorobutadiene and combinations of two or more thereof. It is particularly preferred to use 2,3-dichloro-1,3-butadiene as the butadiene monomer since butadiene homopolymers derived from 2,3-dichloro-1,3-butadiene or butadiene copolymers wherein a major portion of the polymer contains 2,3-dichloro-1,3-butadiene monomer units are particularly useful in adhesive applications.

Copolymerizable monomers herein refers to monomers which are capable of undergoing copolymerization with the butadiene monomers described above. Typical copolymerizable monomers include a-haloacrylonitriles such as α-bromoacrylonitrile and α-chloroacrylonitrile; α,β-unsaturated carboxylic acids such as acrylic, methacrylic, 2-ethylacrylic, 2-propylacrylic, 2-butylacrylic and itaconic acids; alkyl-2-haloacrylates such as ethyl-2-chloroacrylate and ethyl-2-bromoacrylate; styrene; styrene sulfonic acid; α-halostyrenes; chlorostyrene; αmethylstyrene; α-bromovinylketone; vinylidene chloride; vinyl toluenes; vinyinaphthalenes; vinyl ethers, esters, and ketones such as methyl vinyl ether, vinyl acetate, and methyl vinyl ketone; esters, amides, and nitriles of acrylic and methacrylic acids such as ethyl acrylate, methyl methacrylate, glycidyl acrylate, methacrylamide, and acrylonitrile; and combinations of two or more such monomers.

The copolymerizable monomers, if utilized, are preferably α-halo-acrylonitrile and/or α,β-unsaturated carboxylic acid monomers. The copolymerizable monomers are utilized in an amount ranging from about 0.1% to about 30% by weight of the total monomers utilized to form the butadiene polymer.

Two butadiene polymers which are particularly useful in adhesive applications include a butadiene copolymer prepared from butadiene monomers and α-halo-acrylonitrile monomers wherein the α-haloacrylonitrile monomers comprise from about 1% to about 29%, preferably about 5% to about 20% by weight of the total monomers, and a butadiene terpolymer prepared from butadiene monomers, α-haloacrylonitrile monomers, and α,β-unsaturated carboxylic acid monomers, wherein the α-haloacrylo-nitrile monomers comprise from about 1% to about 29%, preferably about 5% to about 20% by weight and the α,β-unsaturated carboxylic acid monomers comprise from about 0.1% to about 10%, preferably about 0.1% to about 1% by weight of the total monomers utilized.

The polyvinyl alcohol (PVA) of this embodiment can be any PVA, commercially or otherwise available, which dissolves in the present aqueous polymerization system at the temperature of the polymerization. Such PVA is usually the product of hydrolysis of polyvinyl acetate, wherein the degree of hydrolysis is preferably about 80% to about 99%. The average degree of polymerization of the PVA is about 350–2,500. For a general discussion of various PVAs, see The Encyclopedia of Polymer Science and Technology, Interscience Publishers, Vol. 14, pp. 149ff, (1971). The preferred proportion of PVA is about 3 to about 12, preferably about 6 to about 8, parts per 100 parts by weight of total monomers. The PVA acts as an emulsion stabilizer during the polymerization.

It is presently preferred to utilize a stabilizing solvent in combination with the polyvinyl alcohol when preparing the latices. The stabilizing solvent useful for preparing the improved latices can essentially be any organic solvent capable of exhibiting miscibility with water. The solvent is preferably an organic alcohol such as methanol; ethanol; isopropanol; butanol; 2-(2-ethoxy ethoxy)ethanol; 2-(2-butoxy ethoxy)ethanol; 2-(2-methoxy ethoxy)-ethanol; 2-methoxy ethanol; 2-butoxy ethanol; 2-ethoxy ethanol; 2-butoxy propanol; 2-butoxy ethoxy propanol and the propoxy propanols; also useful are known glycols including ethylene and propylene glycols, and glycol derivatives such as ethylene glycol mono-methyl ether and propylene glycol monomethyl ether. Various combinations of two or more the foregoing solvents may also be utilized. Preferred stabilizing solvents include methanol, ethanol, isopropanol, butanol, ethylene glycol monomethyl ether, and propylene glycol monomethyl ether. The stabilizing solvent is typically utilized in an amount ranging from about 10 to about 100, preferably from about 30 to about 50, parts by weight per 100 parts by weight of total monomers. The stabilizing solvent is typically vacuum-stripped from the latex after the emulsion polymerization so as to avoid the presence of any volatile material in the final latex. In the case of higher boiling solvents, the solvent may remain in the latex so as to yield a latex which does not require post polymerization stripping.

In carrying out the emulsion polymerization with the preferred stabilizing solvent to produce the latex, other optional ingredients may be employed during the polymerization process. For example, conventional anionic and/or nonionic surfactants may optionally be utilized in order to aid in the formation of the latex. Typical anionic surfactants include carboxylates, such as fatty acid soaps from lauric, stearic, and oleic acid; acyl derivatives of sarcosine, such as methyl glycine; sulfates, such as sodium laurel sulfate; sulfated natural oils and esters, such as Turkey Red Oil; alkyl aryl polyether sulfates; alkali alkyl sulfates; ethoxylated aryl sulfonic acid salts; alkyl aryl polyether sulfonates; isopropyl naphthalene sulfonates; sulfosuccinates; phosphate esters, such as short chain fatty alcohol partial esters of complex phosphates; and orthophosphate esters of polyethoxylated fatty alcohols. Typical nonionic surfactants include ethoxylated (ethylene oxide) derivatives, such as ethoxylated alkyl aryl derivatives; mono- and polyhydric alcohols; ethylene oxide/propylene oxide block copolymers; esters, such as glyceryl monostearate; products of the dehydration. of sorbitol, such as sorbitan monostearate and polyethylene oxide sorbitan monolaurate; amines; lauric acid; and isopropenyl halide. A conventional surfactant, if utilized, is employed in an amount ranging from about 0.01 to about 15, preferably from about 0.1 to about 5 parts by weight per 100 parts by weight of total monomer.

Chain transfer agents may also be employed with the stabilizing solvent during the preferred emulsion polymerization of the adhesive in order to control the molecular weight of the butadiene polymers and to modify the physical properties of the resultant polymers as is known in the art. Any of the conventional organic sulfur-containing chain transfer agents may be utilized such as alkyl mercaptans, dialkyl xanthogen disulfides and sodium thioglycolate. Typical alkyl mercaptans include dodecyl mercaptan, octyl mercaptan, tert-dodecyl mercaptan, tridecyl mercaptan, and mixtures of mercaptans derived from coconut oil (often called lauryl mercaptan), with dodecyl mercaptan being preferred.

The dialkyl xanthogen disulfides can be represented by the structure

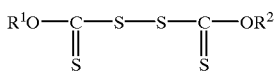

wherein $R^1$ and $R^2$ independently are alkyl radicals having from 1 to about 8 carbon atoms. Examples of suitable alkyl radicals are methyl, ethyl, propyl, isopropyl, and the various isomeric butyl, amyl, hexyl, heptyl and octyl radicals. Preferred dialkyl xanthogen disulfides are those in which each alkyl radical has from 1 to about 4 carbon atoms, especially diisopropyl xanthogen disulfide.

A chain transfer agent, if utilized, is typically employed in an amount ranging from about 0.1 to about 2, preferably from about 0.2 to about 1, parts by weight per 100 parts by weight of total monomer.

As stated above, the formation of the stable latices is preferably carried out by emulsion polymerizing the appropriate monomers in the presence of the polyvinyl alcohol and the stabilizing solvent. Specifically, an aqueous emulsification mixture of water, the polyvinyl alcohol and the stabilizing solvent, is formed to which is added the appropriate monomers. The emulsification mixture typically contains from about 40% to about 80%, preferably about 50% to about 70% by weight of water.

The preferred emulsion polymerization with the stabilizing solvent is typically triggered by a free radical initiator. Typical free radical initiators include conventional redox systems, peroxide systems, azo derivatives, and hydroperoxide systems. The use of a redox system is presently preferred for use include ammonium persulfate/sodium metabisulfite, ferric sulfate/ascorbic acid/hydroperoxide and tributylborane/hydroperoxide. In a preferred embodiment, the redox system utilizes $(NH_4)_2S_2O_8$ (ammonium persulfate) and $Na_2S_2O_5$ (sodium metabisulfite). When utilizing this particular redox system, the $Na_2S_2O_6$ is utilized to prepare the emulsification mixture. The $(NH_4)_2S_2O_8$ is then added to the emulsification mixture along with the appropriate monomers to initiate polymerization. Both the $Na_2S_2O_5$ and the $(NH_4)_2S_2O_8$ are utilized in an amount ranging from about 0.1 to about 3, preferably about 0.2 to about 1, parts by weight per 100 parts by weight of total monomer.

The preferred emulsion polymerization with the stabilizing solvent is typically carried out at a temperature in the range from about 30° C. to about 90° C., preferably about 40° C. to about 60° C. Monomer conversion typically ranges from about 70% to 100%, preferably from about 80% to about 100%.

The polyvinyl alcohol-stabilized butadiene latices typically have a solids content of between about 30% and about 70%, more typically between about 40% and about 60%; a viscosity of between about 50 and about 10,000 centipoise, preferably between about 100 and about 1,000 centipoise; and a particle size between about 100 and about 300 nanometers. The butadiene polymer of the latex typically has a molecular weight of between about 3,000 and about 300,000, preferably between about 35,000 and about 100,000 Mn.

The polyvinyl alcohol-stabilized butadiene latices may also be prepared according to methods such as those disclosed in U.S. Pat. Nos. 3,920,600 and 4,128,514, and in British Patent No. 1,469,993, which are hereby incorporated by reference in this regard.

The polyvinyl alcohol-stabilized butadiene polymer latex is typically utilized in the adhesive in this embodiment in an amount ranging from about 50% to about 99%, preferably from about 80% to about 97% by weight of the essential components of this embodiment. Essential components of this embodiment herein refers to the polyvinyl alcohol-stabilized butadiene polymer latex and the methylene donor compound described hereinafter.

The methylene donor compound can essentially be any compound which is compatible with the other ingredients of the adhesive and which is capable of forming a methylene bridge or linkage between the free hydroxyl groups of the polyvinyl alcohol-stabilized butadiene latex at elevated temperatures. Typical elevated temperatures at which the methylene donor compound is capable of forming methylene bridges are in the range from about 120° C. to about 195° C. Examples of methylene donor compounds include hexamethylene tetramine, paraformaldehyde, s-trioxane, anhydroformaldehydeaniline, ethylene diamine formaldehyde, methylol derivatives of urea and formaldehyde, acetaldehyde, furfural, methylol phenolic compounds, and the like.

The methylene donor compounds are preferably high molecular weight aldehyde homopolymers or copolymers. Typical high molecular weight aldehyde homopolymers and copolymers include acetal homopolymers; acetal copolymers; gamma-polyoxy-methylene ethers having the characteristic structure:

and polyoxymethylene glycols having the characteristic structure:

wherein $R^3$ and $R^4$ can be the same or different and each is an alkyl group having from 1 to about 8, preferably 1 to about 4, carbon atoms; $R^5$ and $R^6$ can be the same or different and each is an alkylene group having from about 2 to about 12, preferably from about 2 to about 8, carbon atoms; n is greater than about 100, and is preferably in the range from about 200 to about 2000; and x is in the range from 0 to about 8, preferably 1 to about 4, with at least one x being equal to at least 1. The high molecular weight aldehyde homopolymers and copolymers are further characterized by a melting point of at least about 75° C., i.e., they are substantially inert with respect to the polyvinyl alcohol-stabilized latex until heat activated; and by being substantially completely insoluble in water at a temperature below the melting point. The acetal homopolymers and acetal copolymers are commercially available. The polyoxymethylene materials are known and can be readily synthesized by the reaction of monoalcohols having from 1 to about 8 carbon atoms or dihydroxy glycols and ether glycols with polyoxymethylene glycols in the presence of an acidic catalyst. A representative method of preparing the polyoxymethylene materials is also described in U.S. Pat. No. 2,512,950, which is incorporated herein by reference. Gamma-polyoxymethylene ethers are the preferred methylene donor compounds and a particularly preferred methylene donor compound is 2-polyoxymethylene dimethyl ether.

The methylene donor compounds are typically utilized in an amount ranging from about 1% to about 50%, preferably from about 3% to about 20% by weight of the essential components of the adhesive of this embodiment.

The adhesive compositions of this embodiment may utilize one or more various optional ingredients selected from the group consisting of a supplemental polymeric film-forming component such as a halogenated polyolefin, a nitroso compound crosslinker, a maleimide compound crosslinker, a vulcanizing agent, an acid-scavenging compound and other additives, all of which are described in more detail above in connection with the other embodiments and thus are not repeated.

Optionally, additives conventionally employed with adhesive compositions, such as fillers, dyes, pigments, extenders, dispersing agents, auxiliary film forming materials, and the like, can be incorporated into the adhesives of this invention for bonding a thermoplastic elastomer with a magnesium containing metal.

The adhesives used in accordance with the present invention are characterized by excellent primary adhesion, environmental resistance, excellent shelf-life stability, resistance to sweep, pre-bake resistance, good layover characteristics, and are effective over a broad spectrum of bonding temperatures, e.g., from about 25° C. to over about 300° C.

The following examples illustrate the process of the present invention. Unless otherwise indicated in the following examples and elsewhere in the written description and claims, all parts and percentages are by weight, all temperatures are in degrees Centigrade, and pressure is at or near atmospheric pressure.

EXAMPLE 1

An assembly of Multi-Flex® TPO, available from Multibase Inc., and a magnesium containing metal containing about 90% magnesium, about 10% and less than 1% of manganese. An adhesive containing about 92% by weight Chemlok® 480 and about 8% Chemlok® Curative 44, both available from Lord Corp., is mixed and applied to the cleaned surface of the magnesium containing metal. The coated metal is optionally heated and then placed in an injection molding device. Hot Multi-Flex® TPO, between 150° C. and 200° C. is injected into the mold. Molding is conducted under about 2,800 psi for 10 seconds.

EXAMPLE 2

An assembly of Alcryn®, available from DuPont/Advanced Polymer Alloys, and a magnesium containing metal containing about 90% magnesium, about 9% aluminum, about 0.7% zinc and about 0.3% manganese. An adhesive containing about 92% by weight Chemlok® 480 and about 8% Chemlok® Curative 44, both available from Lord Corp., is mixed and applied to the cleaned surface of the magnesium containing metal. The coated metal is optionally heated and then placed in an injection molding device. Hot Alcryn®, of about 175° C. is injected into the mold. Molding is conducted under about 4,000 psi for 6 seconds.

EXAMPLE 3

An assembly of Alcryn®, available from DuPont/Advanced Polymer Alloys, and a magnesium containing metal containing about 93% magnesium, about 3% rare earth metals, about 3% zinc and about 1% zirconium. The magnesium containing metal is dipped in a chromate bath containing about 3 g/l of sodium dichromate. An adhesive containing about 92% by weight Chemlok® 480 and about 8% Chemlok® Curative 44, both available from Lord Corp., is mixed and applied to the chromate treated surface of the magnesium containing metal. The coated metal is optionally heated and then placed in an injection molding device. Hot Alcryn®, of about 175° C. is injected into the mold. Molding is conducted under about 3,000 psi for 7 seconds.

The present invention also relates to products containing the aforementioned magnesium containing metal bonded to a thermoplastic elastomer with the adhesive. Such products include hand tools, data recorders and other products, especially products used in harsh environments, such as a manufacturing environment. In this connection, a data recorder made of a magnesium based metal and rubber may be made of the magnesium containing metal, thermoplastic elastomer and adhesive according to the present invention.

While the foregoing Examples have been provided to aid the skilled artisan in more completely understanding the subject invention, they are not intended to in any way limit the scope of the invention. The full breadth of the invention will be apparent to the skilled artisan upon reading the specification, and includes the use of any and all known equivalent processes and materials.

What is claimed is:

1. A bonded assembly comprising:
    a magnesium containing metal comprising at least about 25% by weight magnesium,
    a thermoplastic elastomer, wherein the thermoplastic elastomer comprises a chlorinated olefinic thermoplastic elastomer, and
    an adhesive between the magnesium containing metal and the thermoplastic elastomer, the adhesive comprising from about 20% to about 99% by weight of a polymeric material.

2. The bonded assembly according to claim 1, wherein the magnesium containing metal comprises at least about 50% by weight magnesium.

3. The bonded assembly according to claim 1, wherein the thermoplastic elastomer comprises an olefinic thermoplastic elastomer.

4. The bonded assembly according to claim 1, wherein the adhesive comprises from about 20% to about 99% by weight of at least one polymeric material and from about 1% to about 80% by weight of at least one polymeric complimentary material.

5. The bonded assembly according to claim 1, wherein the polymeric material comprises at least one of a halogenated polymer, a butadiene polymer latex, and a polyester polyurethane.

6. The bonded assembly according to claim 4, wherein the polymeric complimentary material comprises at least one of an aromatic-nitroso compound, a lead acid or metal oxide, a maleimide compound, a vulcanization agent, a phenolic epoxy resin, a phenolic resin, a crosslinking compound, a methylene donor compound, an organic solvent, an organic diluent, and water.

7. A bonded assembly comprising:
    a magnesium containing metal comprising from about 50% to about 99% by weight of magnesium and from about 1% to about 50% by weight of a non-magnesium metal,
    an olefinic thermoplastic elastomer, and
    an adhesive between the magnesium containing metal and the thermoplastic elastomer, the adhesive comprising from about 20% to about 99% by weight of at least one polymeric material and from about 1% to about 80% by weight of at least one polymeric complimentary material, wherein the polymeric material comprises a halogenated polyolefin and a polyester polyurethane, and the polymeric complimentary material comprises a phenolic resin and a cross-linking compound.

8. The bonded assembly according to claim 7, wherein the magnesium containing metal comprises from about 75% to about 98% by weight of magnesium and from about 2% to about 25% by weight of one or more non-magnesium.

9. The bonded assembly according to claim 7, wherein the olefinic thermoplastic elastomer comprises a melt processable olefinic thermoplastic elastomer.

10. The bonded assembly according to claim 7, wherein the polymeric material comprises at least one halogenated polymer, and the polymeric complimentary material comprises at least one aromatic nitroso compound, at least one of a metal oxide compound and a lead salt of an organic and/or inorganic acid, and optionally at least one maleimide compound.

11. The bonded assembly according to claim 7, wherein the polymeric material comprises a polyvinyl alcohol stabilized butadiene polymer latex, and the polymeric complimentary material comprises a methylene donor compound.

12. A bonded assembly comprising:
    a magnesium containing metal comprising from about 50% to about 99% by weight of magnesium and from about 1% to about 50% by weight of a non-magnesium metal,
    a chlorinated olefinic thermoplastic elastomer, and
    an adhesive between the magnesium containing metal and the thermoplastic elastomer, the adhesive comprising from about 20% to about 99% by weight of at least one polymeric material and from about 1% to about 80% by weight of at least one polymeric complimentary material.

13. The bonded assembly according to claim 12, wherein the magnesium containing metal comprises from about 75% to about 98% by weight of magnesium and from about 2% to about 25% by weight of one or more non-magnesium.

14. The bonded assembly according to claim 12, wherein the adhesive comprises from about 30% to about 97% by weight of at least one polymeric material and from about 3% to about 70% by weight of at least one polymeric complimentary material.

15. The bonded assembly according to claim 12, wherein the polymeric complimentary material comprises at least one of an aromatic-nitroso compound, a lead acid or metal oxide, a maleimide compound, a vulcanization agent, a phenolic epoxy resin, a phenolic resin, a crosslinking compound, a methylene donor compound, an organic solvent, an organic diluent, and water.

* * * * *